United States Patent [19]

Hamano et al.

[11] Patent Number: 4,661,908

[45] Date of Patent: Apr. 28, 1987

[54] SALES DATA PROCESSING SYSTEM

[75] Inventors: Koichi Hamano; Hajime Yamato; Hideo Karasawa, all of Shizuoka

[73] Assignee: Tokyo Electric Co., Ltd., Tokyo, Japan

[21] Appl. No.: 743,167

[22] Filed: Jun. 10, 1985

[30] Foreign Application Priority Data

Jun. 13, 1984 [JP] Japan .............................. 59-119792
Jun. 13, 1984 [JP] Japan .............................. 59-119793
Jun. 13, 1984 [JP] Japan .............................. 59-119794

[51] Int. Cl.⁴ ........................ G07G 1/12; G06F 15/21
[52] U.S. Cl. ................................... 364/405; 235/383; 235/385
[58] Field of Search .................. 364/405, 567, 568; 235/383, 385

[56] References Cited

U.S. PATENT DOCUMENTS

| | | | |
|---|---|---|---|
| 4,034,818 | 7/1977 | Matilainen | 364/568 |
| 4,071,740 | 1/1978 | Gogulski | 235/431 |
| 4,373,133 | 2/1983 | Clyne | 235/385 |
| 4,539,650 | 9/1985 | Griffin | 364/567 |
| 4,597,457 | 7/1986 | Ikekita | 364/405 |

FOREIGN PATENT DOCUMENTS 0178223 4/1986 European Pat. Off. ............ 235/383

*Primary Examiner*—Gary V. Harkcom
*Assistant Examiner*—G. Hayes
*Attorney, Agent, or Firm*—Frishauf, Holtz, Goodman & Woodward

[57] ABSTRACT

A sales data processing system reads sales data containing article codes previously attached to sales articles, and executes registration of sales data according to the sales data thus read. The sales data processing system includes an initial weighing scale for measuring weight of a plurality of sales articles whose sales data is to be read out, a second weighing scale for measuring weight of a plurality of sales articles whose sales data have been read out, first and second data memories for storing stable weight data from the first and second weighing scales, third and fourth memories for storing variation amounts of weight data derived from the first and second weighing scales when an article is removed from the first weighing scale and is then placed on the second weighing scale after the sales data of the article is read out, and a data processing unit for executing the registration of the sales data according to the readout sales data when it is detected that the contents in the third and fourth memories are substantially coincident with each other.

10 Claims, 6 Drawing Figures

4,661,908

SALES DATA PROCESSING SYSTEM

BACKGROUND OF THE INVENTION

The present invention relates to a sales data processing system for registering or processing sales data on sales articles.

In order to register sales data with a conventional sales data processing system, a cashier operates keys on a keyboard, or uses a code reader such as a code scanner to read article codes which are attached to sales articles. In general, a cashier at a counter picks up the articles carried to her by a customer and, for sales data scanning, moves the articles one by one above the code scanner to read the article code attached to the article. Such scanning work is troublesome for the cashier. In order to lessen the cashier's work in sales data registration, it is considered that the customer, not the cashier, should effect the reading operation of article codes through self-use of the code scanner or code reader. In this case, however, it will become necessary for the cashier to constantly check whether or not the customer honestly performs the code scanning of the articles. This will frequently impede the efficiency of the cashier. Further, the cashier must watch the customer's scanning, to confirm completion of the scanning operation, and then operate the data processing system to display the total amount of the sale. This work is troublesome.

SUMMARY OF THE INVENTION

Accordingly, an object of the present invention is to provide a sales data processing system which can reliably prevent the sales data from being incorrectly processed. To achieve the above object, there is provided a sales data processing system comprising a reading unit for reading sales article data attached to sales articles; a first weighing scale for measuring weight of one or a plurality of sales articles whose sales data are to be read out by the reading unit, to produce weight data corresponding to a stable measured weight value; a second weighing scale for measuring weight of one or a plurality of sales articles whose sales data have been read out by the reading unit, to produce weight data corresponding to a stable measured weight value; first and second data memories for storing weight data from the first and second weighing scales; a first scale variation data memory for storing a weight data difference representing a changed amount of the weight data in the first scale data memory, when the weight data derived from the first weighing scale differs in amount from the contents in the first scale data memory; a second scale variation data memory for storing a weight data difference representing the changed amount of the weight data in the second scale data memory, when the weight data derived from the second weighing scale differs in amount from the contents in the second scale data memory; an article data memory for storing the article data as read out by the reading unit; and a data processing unit for registering the article data according to the sales data stored in the article data memory, when the data processing unit detects that the contents of the first and second scale variation data memories are substantially coincident with each other.

Also, in the sales data processing system of the present invention, the sales data read out by the reading unit is treated as effective data only when the sales article, which is picked up from the first weighing scale and whose article data is read out by the reading unit, is placed on the second scale. With this feature, any operator can easily and reliably register sales data, free of any complications.

DETAILED DESCRIPTION OF THE PREFERRED EMBODIMENTS

Figure 1:
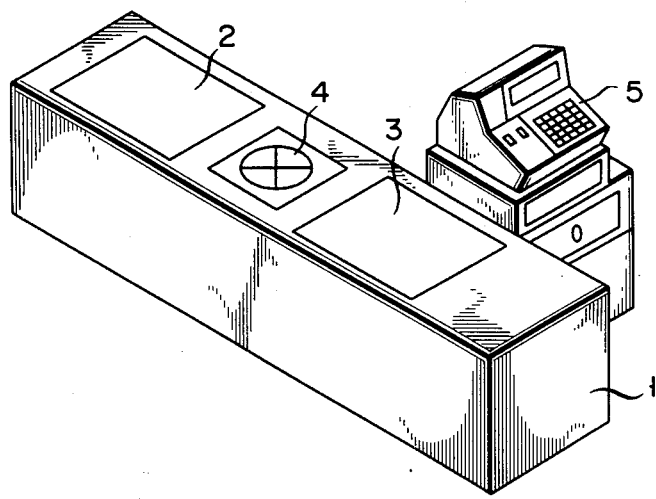
FIG. 1 shows a perspective view of a sales data processing system according to an embodiment of the present invention.

FIG. 1 shows a perspective view of a sales data processing system according to an embodiment of the present invention. This system is comprised of a check-out stand 1, two weighing scales 2 and 3 separately provided on the stand 1, an installation type code scanner 4 provided between the scales 2 and 3 on the stand 1, and an electronic cash register electrically connected to the weighing scales 2 and 3 and the code scanner 4 by cables (not shown).

Figure 2:
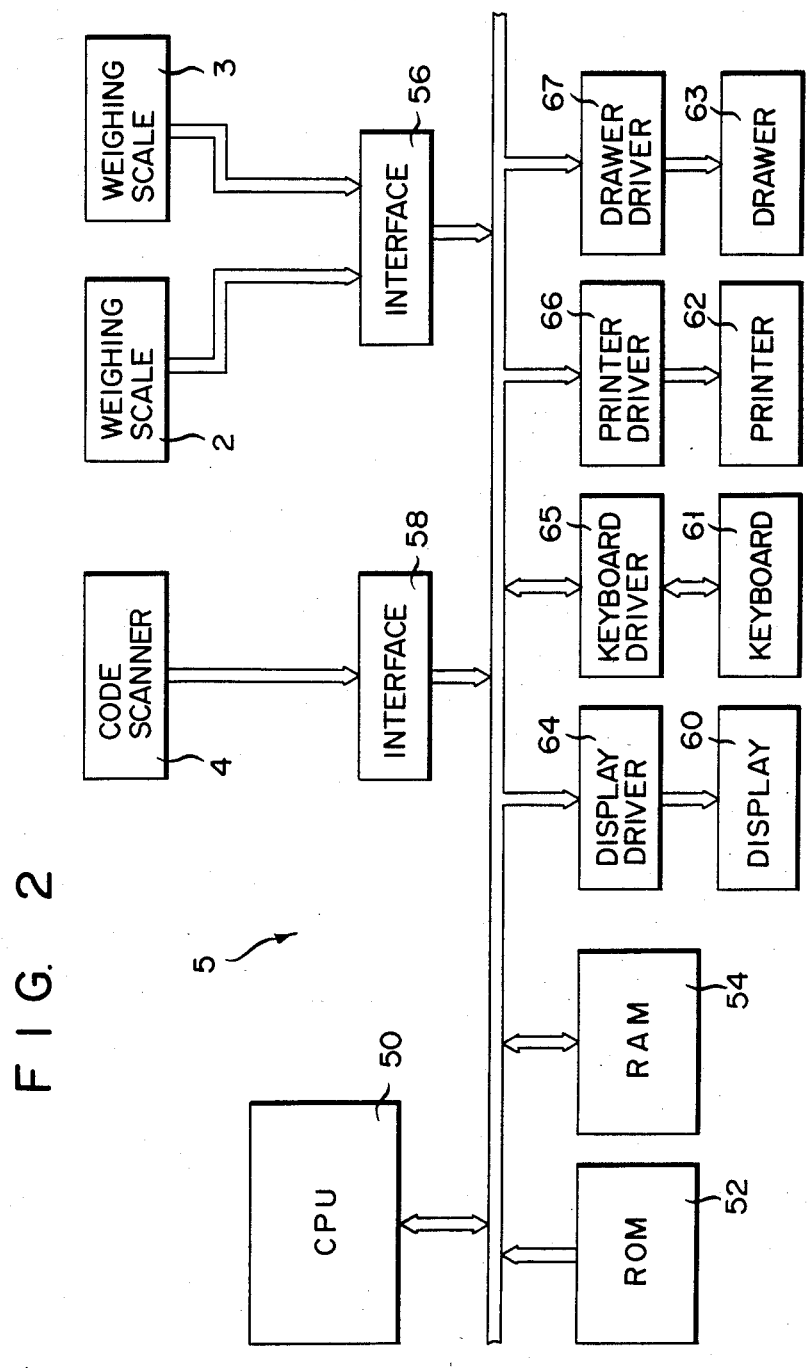
FIG. 2 shows a block diagram of a data processing circuit of the sales data processing system shown in FIG. 1.

FIG. 2 shows a block diagram of an electric circuit of the sales data processing system shown in FIG. 1. In this system, the electronic cash register 5 includes a central processing unit (CPU) 50, a read only memory (ROM) for storing an execution program for the CPU 50 and a random access memory (RAM) 54 for temporarily storing data and the like supplied from the weighing scales 2 and 3 and the scanner 4. The CPU 50 is connected to the scales 2 and 3 by way of an interface 56, and also to the code scanner 4 through another interface 58. The CPU 50 is further connected to a display 60, a keyboard 61, a printer 62 and a drawer 63 respectively through a display driver 64, a keyboard driver 65, a printer driver 66, and a drawer driver 67.

Figure 3:
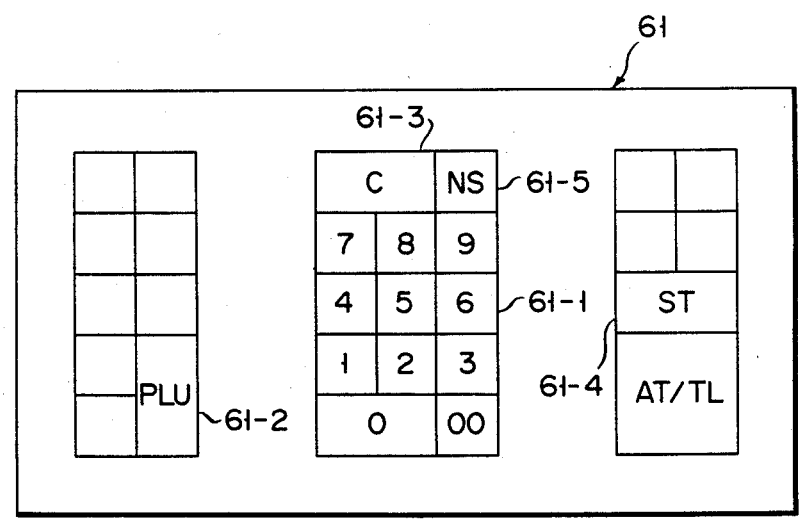
FIG. 3 shows a keyboard used by the system shown in FIG. 1.

FIG. 3 illustrates in detail the keyboard 61 shown in FIG. 2. The keyboard 61 contains ten keys 61-1, a PLU key 61-2 for registering single article data, a clear key 61-3, an ST key 61-4 for providing a display of a sub total, and an NS key 61-4 for money exchange.

Figure 4:
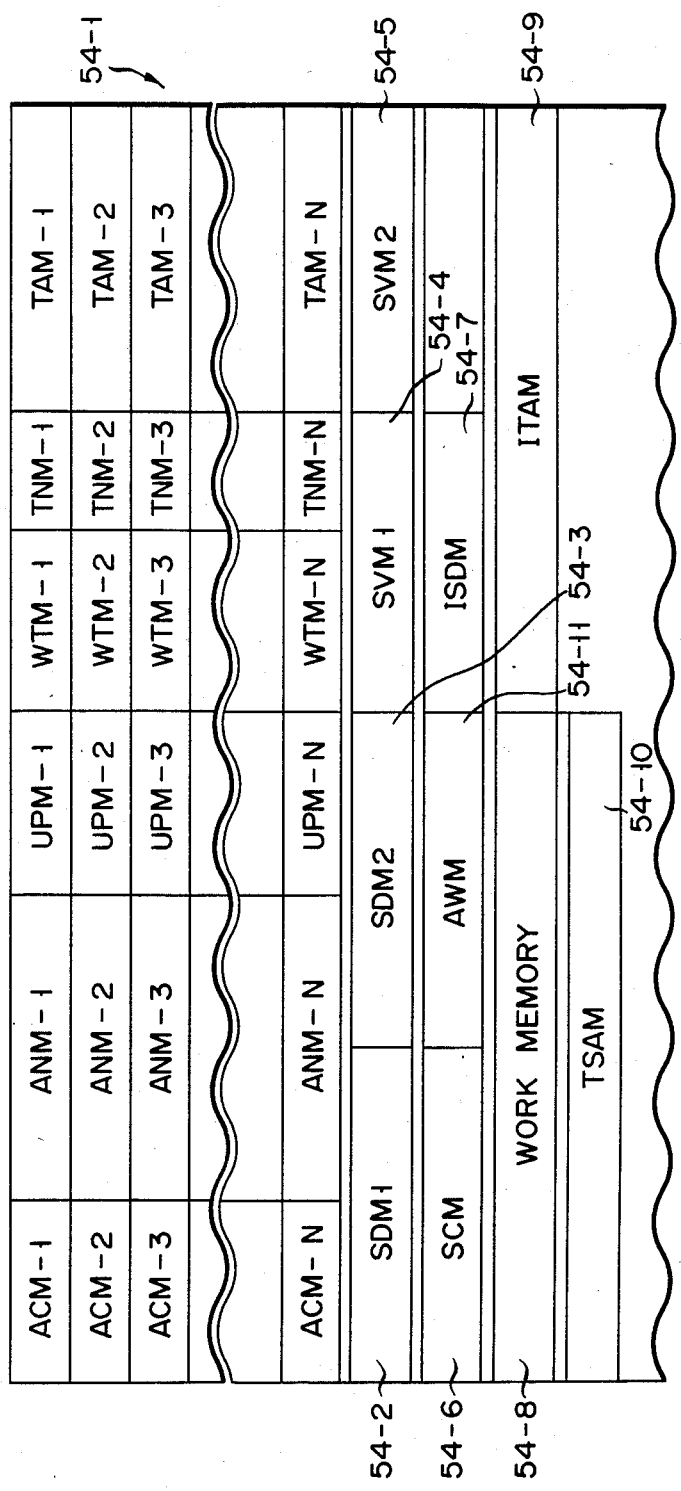
FIG. 4 shows a memory map of a random access memory used in the data processing circuit shown in FIG. 2.

FIG. 4 shows a memory map of the RAM 54 shown in FIG. 2. This RAM includes, for example, a memory 54-1, first and second scale data memories (SDM1) 54-2 and (SDM2) 54-3, first and second scale variation memories (SVM1) 54-4 and (SVM2) 54-5, a scanning code memory (SMC) 54-6, an initial scale data memory (ISDM) 54-7, a work memory 54-8, an intermediate total amount memory (ITAM) 54-9, a total sales amount memory (TSAM) 54-10, and an article weight memory (AWM) 54-11. The memory 54-1 includes sales code memory areas ACM-1 to ACM-N for storing sales codes previously assigned to sales articles, memory areas ANM-1 to ANM-N for storing names of sales articles, memory areas UPM-1 to UPM-N for storing unit prices of articles, memory areas WTM-1 to WTM-N for storing data on article weights, memory areas TNM-1 to TNM-N for storing the number of sales articles to be registered, and total amount memory areas TAM-1 to TAM-N for storing the total amount of sold articles of the same article code. The first and second scale data memories 54-2 and 54-3 store weight data of articles measured by the first and second scales 2 and 3, respectively. First and second scale variation data memories 54-4 and 54-5 store changed weight values for the first and second scales, respectively. The scanning code memory 54-6 stores an article code read out by the code scanner 4. The initial scale data memory 54-7 stores the initial weight data measured by the first scale 2. The intermediate total amount memory stores the total amount of sales articles for one customer. The total sales amount memory (TSAM) 54-10 stores the total sales amount of sales articles for each customer. The article weight memory 54-11 temporarily stores the weight data as written into one of the weighing memory areas, WTM-1 to WTM-N.

Figure 5A:
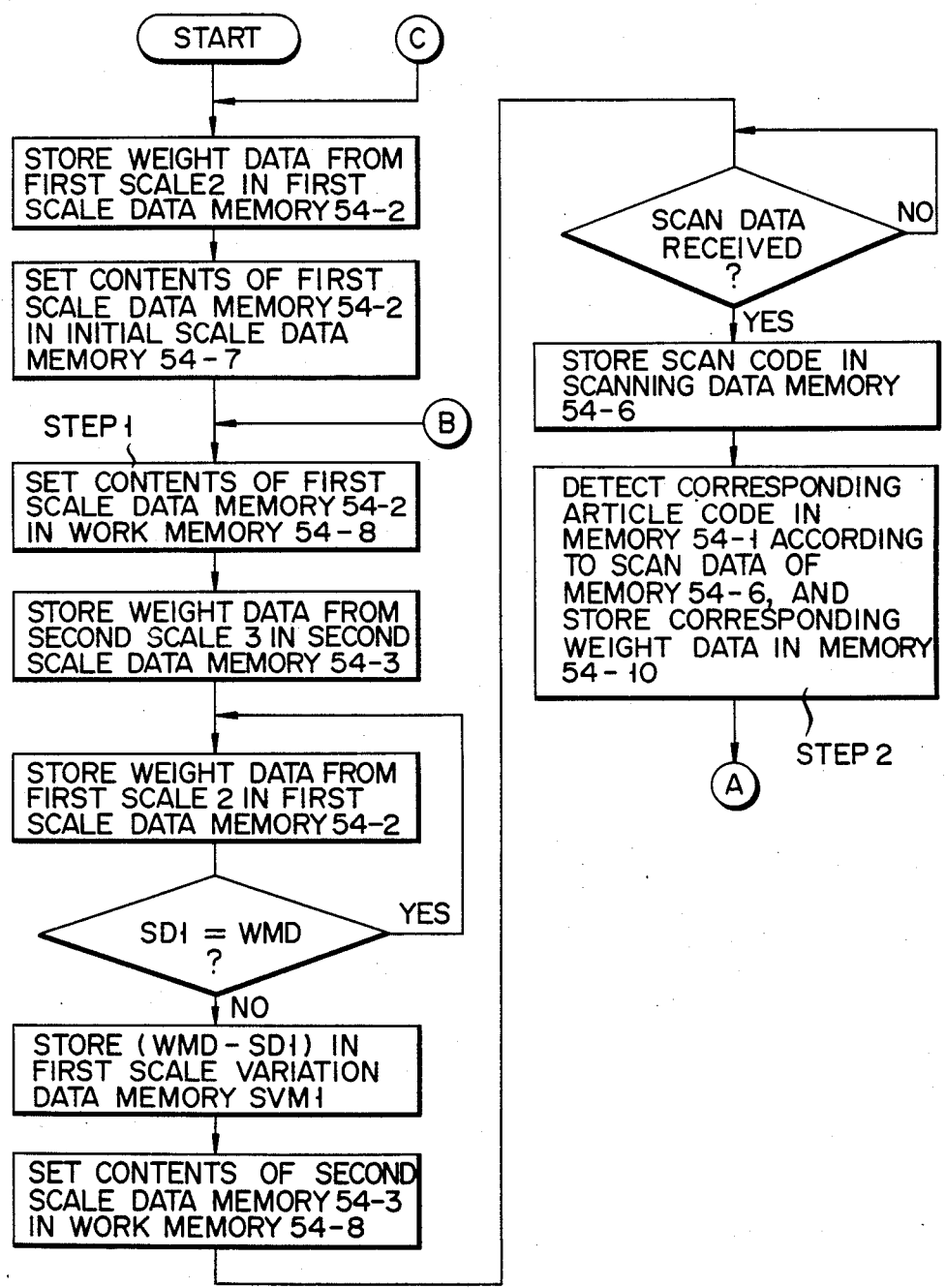
FIGS. 5A and 5B show a flowchart for explaining the operation of the data processing circuit shown in FIG. 2.
Figure 5B:
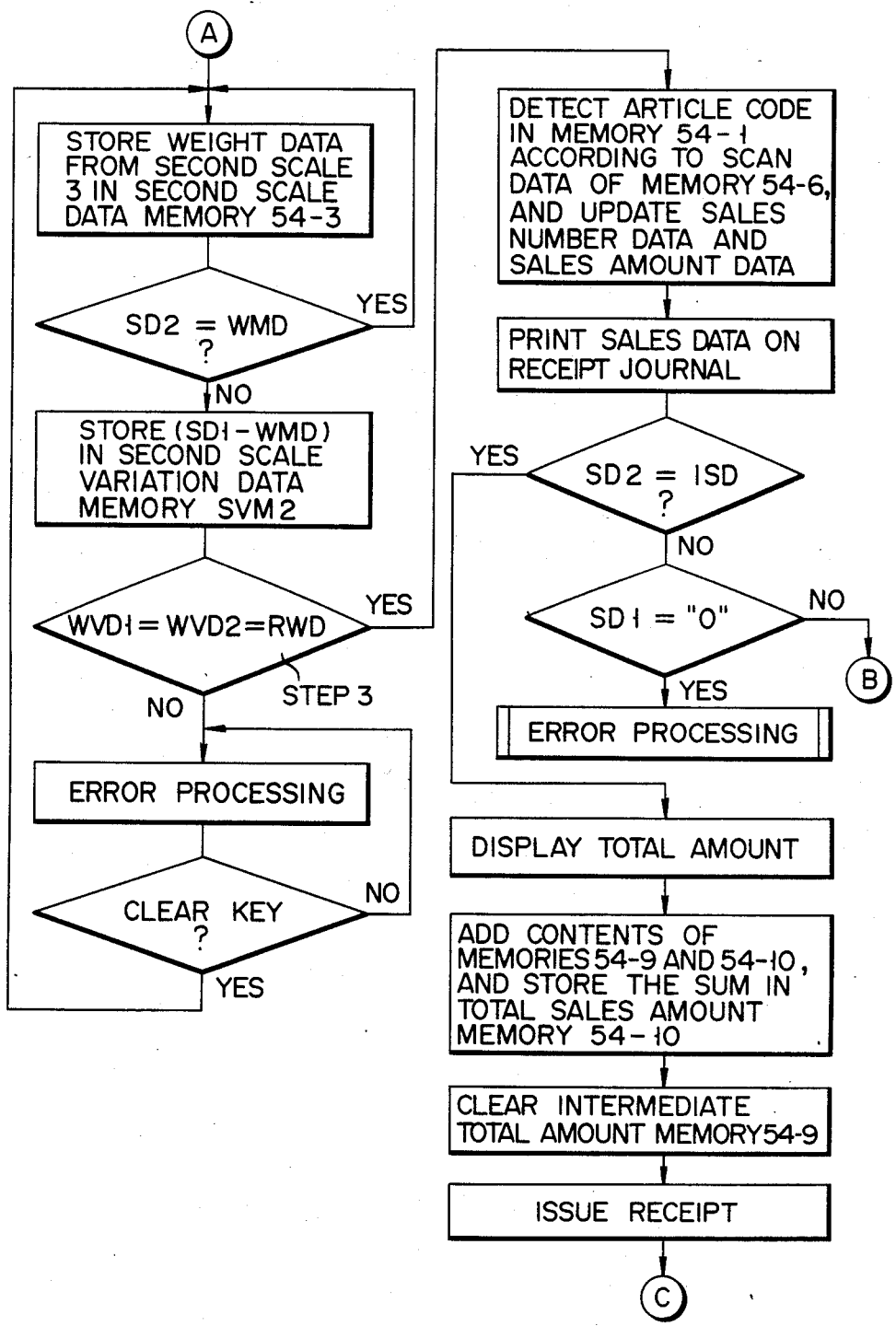

The CPU 50 executes the control as shown in FIGS. 5A and 5B, under control of the program data stored in the ROM 52. The CPU 50 first detects that the weight data derived from the first weight scale 2 increasingly varies from "0" gram and is set at a fixed value greater than the minimum effective weight, that is, an article or all of the articles purchased by a customer have been placed on the first scale 2. Upon this detection, the CPU 50 retrieves the stable weight data from the first weight scale 2, and stores it in the first scale data memory 54-2. The first weighing scale 2 holds the previous weight data as the effective data until the weight data becomes stable. This is done by the known manner. After the weight data becomes stable, the scale 2 produces the new stable weight data. Following this, the CPU 50 sets the contents of the first scale data memory 54-2 into the initial scale data memory 54-7. Further, in STEP 1, the CPU 50 sets the contents of the memory 54-2 into the work memory 54-8. The CPU 50 also retrieves the weight data from the second weighing scale 3, and stores it in the second scale data memory 54-3. Initially, no article is placed on the scale 3, and hence the weight data from scale 3 is "0". Under this condition, the CPU 50 repeatedly stores the weight data of the first scale 2 into the first scale data memory 54-2. During this repetitive storing process, the CPU 50 checks whether or not the contents SD1 of the first scale data memory 54-2 is equal to the contents WMD of the work memory 54-8. By this process, it is determined whether or not an article has been picked up from the first scale 2. If, in STEP 1, the check result is NO, that is, the contents of the memory 54-2 are not equal to those of the work memory 54-8, the CPU 50 inhibits the setting of the weight data of the scale 2 into the memory 54-2. This being the case, the CPU 50 subtracts the data SD1 of the memory 54-2 from the data WMD of the memory 54-8, thereby to obtain a weight variation. The weight variation data WVD1 is then set into the scale variation data memory 54-4. Subsequently, the CPU 50 sets the data SD2 of the second scale data memory 54-3 into the work memory 54-8. Under this condition, the CPU 50 checks whether or not a code of the article is scanned for its reading out by the scanner 4, that is, whether the code data is received or not. If the check result is YES in this step, the code, as read out, is stored in the scanning data memory 54-6. Then, in STEP 2, using the article code AC stored in the memory 54-6, the CPU 50 detects corresponding data in one of the article code memory areas ACM-1 to ACM-N in the memory 54-1, reads out the registered weight data RWD of the corresponding article from a corresponding one of the weight data memory areas WTM-1 to WTM-N and sets the registered weight data into the article weight memory 54-11. Under this condition, the CPU 50 checks whether or not the weight data in the second scale data memory 54-3 is equal to that in the work memory 54-8, while repeating the storing of the weight data of the second scale 3 into the memory 54-3. This operation is effected by the CPU 50 to check if the code scanned article is set on the second scale 2. If the check result is NO, that is, if the weight data SD2 of the memory 54-3 is different from that WMD of the work memory 54-8, the CPU 50 inhibits the weight data of the scale 3 from being stored in the scale data memory 54-3, while at the same time obtaining a weight variation by subtracting the data SD2 of the memory 54-3 from the data WMD of the work memory 54-8, which data it stores in the second scale variation data memory 54-5. Further, in STEP 3, the CPU 50 compares the data WVD1 of the first scale variation data memory 54-4, the data WVD2 of the second scale variation data memory 54-5, and the data RWD of the article weight memory 54-11. If these data are not equal to one another, the CPU 50 determines that the article scanned differs from the article placed on the second scale 3, and that the customer might have act dishonestly or erroneously in scanning. Upon this decision, the CPU 50 executes an error processing function. During error processing, the CPU 50 announces an error by driving an alarm buzzer or an alarm lamp. To clear error processing, the cashier need only push a clear key 61-3. If these items of data WVD1, WVD2 and RWD are coincident in value with one another, the CPU 50 searches the memory 54-1 for the article code stored in the scanning data memory 54-6. By this search, the CPU 50 reads out data on the unit price, a total number of sales articles, and a total amount of sales articles from the memory areas UPM-i, TNM-i, and TAM-i, which correspond in the memory map to the memory area ACM-i storing that article code. 1 is added to the total number of sales articles to provide a new total number of sales articles. Correspondingly, a unit price is added to the total amount of sales articles to provide a new total amount. These new data are stored in the memory areas TNM-i and TAM-i, respectively. At this point, the CPU 50 completes the registration of the single article data and clears the contents of the first and second scale variation data memories 54-4 and 54-5. Additionally, the CPU 50 drives the printer 62 to print on a recording paper, such as a receipt, the article code in the memory area ACM-i and the data of the unit price stored in the memory area UPM-i, for example. The contents SD2 of the second scale data memory 54-3 are compared with the contents ISD of the initial scale data memory 54-7. When the contents are not coincident with each other, and it is detected that the weight measured by the first scale is not 0 gram, the CPU 50 decides that the scanning of the article is not complete. Upon this decision, the CPU 50 returns its data processing procedure to the first step for storing the contents SD1 of the first scale data memory 54-2 into the work memory 54-8, and prepares for the scanning operation of the next article. When the contents SD2 and ISD are not coincident and the weight measured by the first scale is 0 gram, the CPU 50 executes the error processing to turn on an alarm lamp or sound an alarm buzzer (not shown). When the contents of the second scale data memory 54-3 are coincident with those of the initial scale data memory 54-7, the CPU 50 decides that all of the scanning operations by the customer are complete. The CPU 50 then drives the display 60 to display a total amount of all of the articles purchased by the customer on the basis of the contents of the intermediate total amount memory 54-9. Then, in the total sales amount memory 54-10, the total sales amount in the intermediate total amount memory 54-9 are accumulated. The intermediate total amount memory 54-9 is cleared, and the receipt feeder of the printer 17 is driven to issue a receipt.

In the embodiment of the present invention, thus described, single article data can be registered by merely reading out article codes attached to articles without a key-in operation on the keyboard. In this respect, the registering operation of sales data is very simple and easy. Further, the scanning of the articles by the scanner 4 can be done by a customer, lessening the work load of the cashier. To be more specific, at the counter, a customer places, on the first scale, all of the articles selected for purchase. Picking up the articles one by one, the costomer moves them it over the scanner 4 for a reading of the article code, and then places them, individually, on the second scale 3. At this time, the sales data processing system detects a weight variation of the article on the first scale 2, every time said customer picks up the article. Similarly, the processing system detects a weight variation of the article on the second scale 3 every time said customer places an article on the second scale. Then, the processing system compares the preset weight of the scanned article of the same article code with each of the detected weight variations on the first and second scales 2 and 3. If these values are not equal, the system decides that the customer must have performed an erroneous operation. For example, an article picked up from the first scale and transferred to the second scale might be an improper article, or a plurality of articles of the same type might be transferred from the first scale to the second scale under the same scanning. Whatever the case, the system executes error processing. Thus, even if the cashier leaves his seat, an erroneous operation by the customer is readily detected, thereby preventing erroneous registering of sales data due to the customer's incorrect scanning. As seen from the foregoing, the need for the cashier to constantly monitor the customer's action is completely eliminated, thereby improving the sales data registration procedure while lessening the cashier's work load.

In the above-mentioned embodiment, the weight variations on the first and second scales and the inherent weight of the articles are compared with one another. Alternatively, either of the weight variations on the first or second scales and the weight of the article may be compared for the same purpose.

Further, in the above-mentioned embodiment, the sales data processing system was applied to the single electronic cash register. The system may be applied to a POS system in which a plurality of electronic cash registers used as POS terminal devices are controlled by terminal controllers with file memories, respectively. In this case, the single article registering memory may be provided by the file memory.

Additionally, in the above embodiment, the previously registered weight data RWD corresponding to the article code, as detected by the scanning, was used in executing STEP 3. This weight data RWD may be omitted, if necessary. In this case, in the RAM 54 shown in FIG. 4, the weight memory areas WTM-1 to WTM-N and the article weight memory 54-11 are also omitted. Similarly, STEP 2 in the flowchart in FIG. 5 is omitted. In this modified form, the processing in STEP 3 compares the contents WVD1 and WVD2 in the first and second scale variation data memories 54-4 and 54-5. When the variation data WVD1 and WVD2 are different from each other, the CPU 50 executes error processing, and when the variation data WVD1 and WVD2 are coincident with each other, the total sales number and the total cash amount are updated as in the previous manner.

The weight measuring accuracy requirement of the weighing scales 2 and 3 is not strict in general use of the sales data processing system of the present invention. However, in order to calculate the price of an article on the basis of the measured weight, a high measuring accuracy is required for at least one of the weighing scales 2 and 3. Additionally, when the bar code as the article code contains the information representing the price of the article, the price data may be derived from the article code and directly stored into the RAM 54 without using the unit price memory areas UPM-1 to UPM-N.

What is claimed is:

1. A sales data processing system comprising:
   data reading means for reading sales article data previously attached to sales articles;
   first weighing scale means for measuring weight of one or a plurality of sales articles whose sales data are to be read out by said data reading means, to produce weight data corresponding to a stable measured value;
   second weighing scale means for measuring weight of one or a plurality of sales articles whose sales data have been read out by said data reading means, to produce weight data corresponding to a stable measured value;
   first and second memory means for storing weight data from said first and second weighing scales;
   third memory means for storing data representing a difference between the weight data derived from said first weighing scale means and the contents in said first memory means when the former contents have varied from the latter contents;
   fourth memory means for storing data representing a difference between the weight data derived from said second weighing scale means and the contents in said second memory means when the former contents have varied from the latter contents;
   fifth memory means for storing sales data read by said data reading means;
   means for comparing the respective differences stored in said third and fourth memory means; and
   data processing means for executing the registration of the article data according to the sales data stored in said fifth memory means, when said data processing means detects that the contents of said third and fourth memory means are substantially coincident with each other.

2. A sales data processing system, according to claim 1, which further comprises display means and initial weight data memory means for storing initial weight data derived from said first weighing scale means when at least one article, the sales data of which is to be read out, is placed on said first weighing scale means, and in which said data processing means terminates the registration of sales data for said at least one article when it is detected that the weight data derived from said second weighing scale means is substantially equal to the weight data in said initial weight data memory means, and which, at the same time, displays, by said display means, the total amount data as obtained on the basis of the registration data stored in said registration memory means.

3. A sales data processing system, according to claim 1, which further comprises article weight data memory means for storing weight data corresponding to a plurality of article data, and wherein said data processing means inhibits said registration when it is not detected that the contents of said third and fourth memory means are each equal to the registered weight data as determined by the article data in said article data memory.

4. A sales data processing system, according to claim 3, wherein said registration memory means includes article data memory areas for storing a plurality of article data, unit price memory areas for storing a plurality of unit price data corresponding to said article data and a plurality of total amount memory areas provided for said article data and said data processing means, and which, in executing registration, detects one of said article data memory areas which stores article data corresponding to the sales data stored in said article data memory, and reads out unit price data from corresponding one of said unit price memory areas, accumulatively storing the unit price data into a corresponding one of said total amount memory areas.

5. A sales data processing system, according to claim 2, wherein said data processing means compares weight data from said second memory means and initial weight data memory means with each other to determine whether the weight data from said second weighing scale means is equal to the weight data in said initial weight data memory means.

6. A sales data processing system, according to claim 2, wherein said registration memory means includes article data memory areas for storing a plurality of article data, unit price memory areas for storing a plurality of unit price data corresponding to said article data and a plurality of total amount memory areas provided for said article data and said data processing means, which, in executing registration, detects one of said article data memory areas which stores article data corresponding to the sales data stored in said article data memory, and reads out unit price data from corresponding one of said unit price memory areas, accumulatively storing the unit price data into a corresponding one of said total amount memory areas.

7. A sales data processing system according to claim 1, wherein said registration memory means includes article data memory areas for storing a plurality of article data, unit price memory areas for storing a plurality of unit price data corresponding to said article data and a plurality of total amount memory areas provided for said article data and said data processing means, which, in executing the registration, detects one of said article data memory areas which stores article data corresponding to the sales data stored in said article data memory, and reads out unit price data from a corresponding one of said unit price memory areas, accumulatively storing the unit price data into corresponding one of said total amount memory areas.

8. A sales data processing system according to claim 1, which further comprises article weight data memory means for storing weight data corresponding to a plurality of article data, and in which said data processing means inhibit said registration when it is not detected that the contents of said third and fourth memory means are each equal to the registered weight data as determined by the article data in said article data memory.

9. A sales data processing system, according to claim 2, which further comprises article weight data memory means for storing weight data corresponding to a plurality of article data, and wherein said data processing means inhibits said registration when it is not detected that the contents of said third and fourth memory means are each equal to the registered weight data as determined by the article data in said article data memory.

10. A sales data processing system, according to claim 3, wherein said registration memory means includes article data memory ares for storing a plurality of article data, unit price memory areas for storing a plurality of unit price data corresponding to said article data and a plurality of total amount memory areas provided for said article data and said data processing means, and which, in executing registration, detects one of said article data memory areas which stored article data corresponding to the sales data stored in said article data memory, and reads out unit price data from corresponding one of said unit price memory areas, accumulatively storing the unit price data into a corresponding one of said total amount memory areas.

* * * * *